March 2, 1971   J. W. COX   3,567,220
PLAYGROUND SWING ACTUATOR
Original Filed June 29, 1964   3 Sheets-Sheet 1

JAMES W. COX
INVENTOR.

BY.

March 2, 1971     J. W. COX     3,567,220
PLAYGROUND SWING ACTUATOR
Original Filed June 29, 1964     3 Sheets-Sheet 2
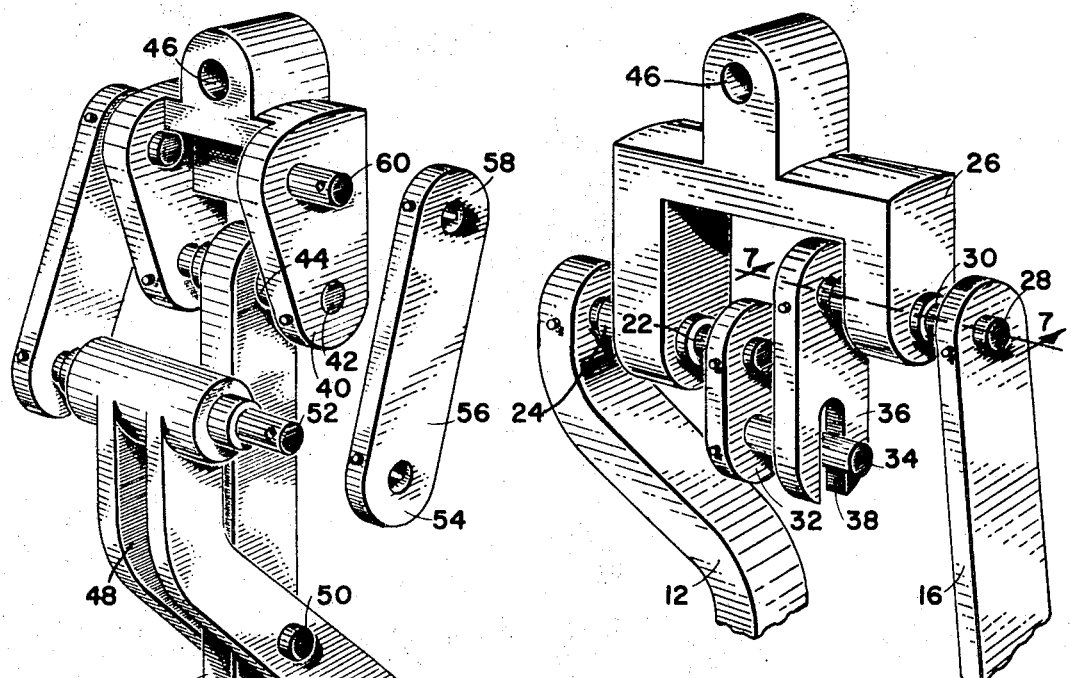
Fig. 2.
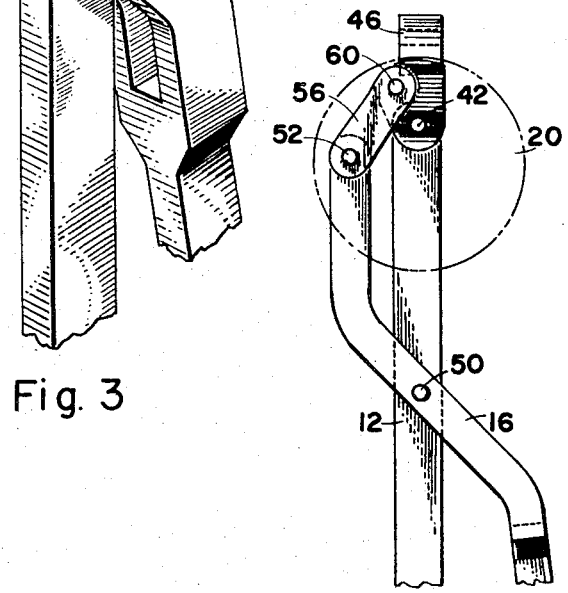
Fig. 3
Fig. 4.
JAMES W. COX
INVENTOR.
BY March 2, 1971  J. W. COX  3,567,220

PLAYGROUND SWING ACTUATOR

Original Filed June 29, 1964  3 Sheets-Sheet 3

JAMES W. COX
INVENTOR.

BY Townsend and Townsend

United States Patent Office 3,567,220
Patented Mar. 2, 1971

3,567,220
PLAYGROUND SWING ACTUATOR
James W. Cox, P.O. Box 193,
Upper Lake, Calif. 95485
Original application June 29, 1964, Ser. No. 378,746, now abandoned. Divided and this application Nov. 30, 1967, Ser. No. 704,964
Int. Cl. A63g 9/16
U.S. Cl. 272—89                              4 Claims

ABSTRACT OF THE DISCLOSURE

A playground swing having a first depending arm on which is mounted a rider supporting seat and a second depending arm positioned to be accessible to a rider occupying the seat. A mechanical linkage between the two arms, which mechanical linkage affords a motion amplification or reduction between the two arms so that the rider can control his swinging movement by application of force on the second depending arm.

---

This is a division of copending application Ser. No. 378,746, filed June 29, 1964, and now abandoned.

This invention relates to a playground swing actuator and more particularly to a mechanism that permits the rider of a swing to exert control over the speed and amplitude of swinging movement.

The primary object of the present invention is to provide a swing having a pair of arms, one arm supported for pendulous movement with respect to a frame and having a rider seat thereon, the other arm being linked to the first arm by a mechanism affording motion multiplication with respect to the first arm so the pendulous movement of the first arm can be controlled by the second arm. Accomplishment of the foregoing object enhances the safety and enjoyment of swinging.

Another object of my invention is to provide a yieldable connection between the actuating arm and the driving mechanism so that the swing cannot be driven with excessive force. Attainment of this object is made possible by the provision of a spring loaded detent type mechanism between the operating arm shaft and the linkage connecting the shaft to the seat arm.

Still another object of the present invention is to provide a mechanism for actuating a playground swing in which all moving parts of the mechanism are remote from the seat and are sufficiently compact to be enclosed in a housing. Therefore the likelihood of injury to fingers and like, present in certain prior art swings, is virtually eliminated.

These and other objects, features and advantages will be more apparent after referring to the following specification and accompanying drawings, in which:

FIG. 2 is a detail perspective view of one form of operative linkage of my invention;

FIG. 3 is a detail perspective view of another form of operative linkage of my invention;

FIG. 4 is a side view of the mechanism of FIG. 3;

Figure 1:
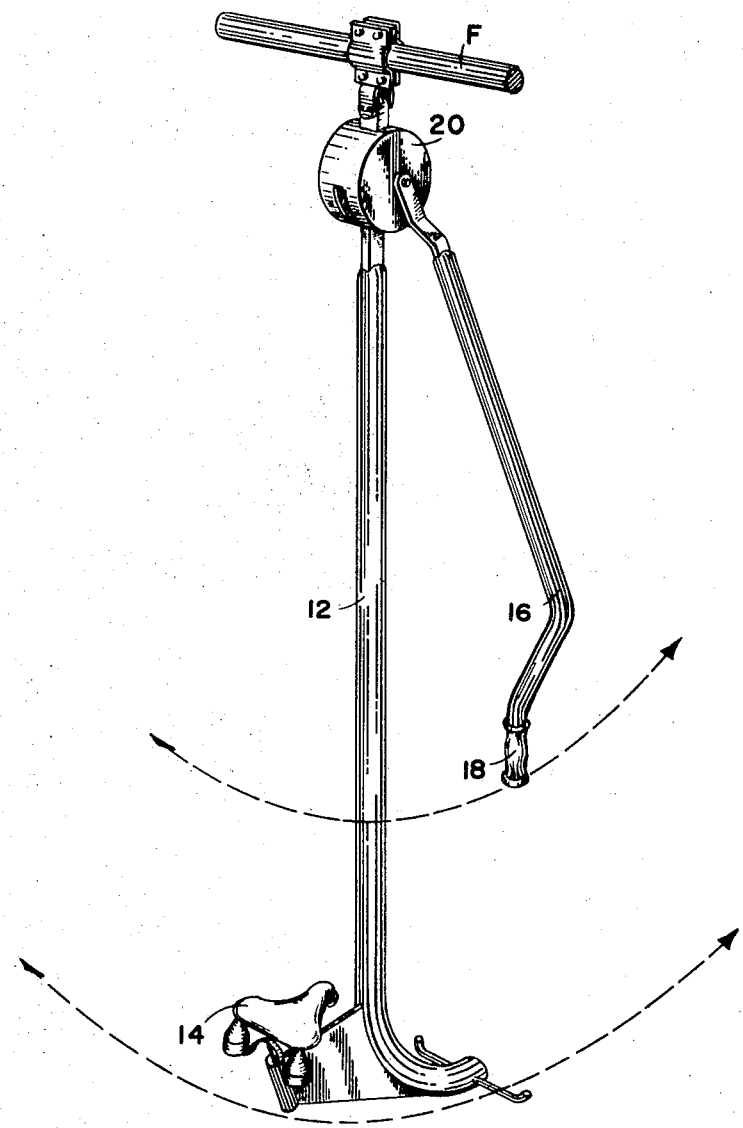
FIG. 1 is a perspective view of a playground swing incorporating my invention.

Reference character F indicates a frame member supported by any conventional structure above a ground surface such as are typically seen in and about playgrounds. Attached to frame F is the swing of my invention generally including an arm 12 on which is mounted a rider supporting seat 14 and which is mounted for pivotal movement about a horizontal axis in fixed spaced relation to frame F. An actuating arm 16, having a handle 18 disposed proximate seat 14 and accessible to an occupant of the seat, is linked to arm 12 by an actuating mechanism disposed within a housing 20. As will appear hereinafter the actuating mechanism is so constructed that a motion of arm 16 is multiplied by the actuating mechanism so that greater motion is applied to arm 12.

Referring to FIG. 2, arm 12 is mounted for pendulous movement on a shaft 22 that is journalled in a bushing 24 supported in a bracket 26 that is mounted on frame F. Actuator arm 16 is affixed to a shaft 28 journalled in a bushing or the like 30 also supported in bracket 26. It will be noted that shafts 22 and 28 are disposed in parallel spaced apart axes. Secured to the opposite end of shaft 22 and extending perpendicularly therefrom is a lever arm 32, the arm terminating remote from shaft 28. Extending from lever arm 32 and generally parallel with shaft 22 is a pin 34. Attached to the opposite end of shaft 28 is a second lever arm 36 which extends toward the pin 34 and is provided in the end thereof with a slot 38 which slidably embraces pin 34.

In operation the embodiment of my invention shown in FIG. 2 can be actuated by moving lever 16, for example toward the left as viewed in the figure, as a consequence of which arm 12 will also be moved toward the left. Because the distance from shaft 28 to pin 34 exceeds the distance from shaft 22 to the pin, a motion multiplication is provided so that the motion applied at lever 16 will be multiplied and applied to arm 12 on which the rider is seated. The rider can control his pendulous movement on arm 12 by controlling the force which he applies to arm 16. Moreover, because the arrangement of the linkage, arms 12 and 16 generally follow one another so that the extremity of arm 16 is always accessible to a rider in the seat.

The modification of my invention in FIG. 3 includes a bracket 40 in which is mounted a shaft 42 on which is journalled a bearing 44 for supporting arm 12 from pendulous movement about the shaft. Bracket 42 is provided with a hole 46 which is provided for attaching the bracket to frame F and which hole is formed on an axis generally perpendicular to the axis of the shaft 42. Arm 16 is provided with a slot 48 which permits arms 16 and 12 to be pivotally connected by pin 50 at their point of intersection. The upper extremity of arm 16 constitutes a lever and is provided with a shaft 52 to which is joined one end 54 of a link 56. The opposite end 58 of link 56 is pivotally attached to a shaft 60 on bracket 40. Shaft 60 is parallel to shaft 42 and is spaced therefrom by an amount much less than the distance from shaft 42 to shaft 50 and less than the distance from the shaft 52 to shaft 50. Consequently a four-bar linkage is formed and motion applied to arm 16 will be multiplied by the linkage so as to permit a rider on seat 14 to propel himself. It should be noted with respect to the linkage depicted in FIGS. 3 and 4 that arms 12 and 16 move with one another so that handle 18 on the lower extremity of arm 16 is always accessible to the rider.

Figures 5, 6:
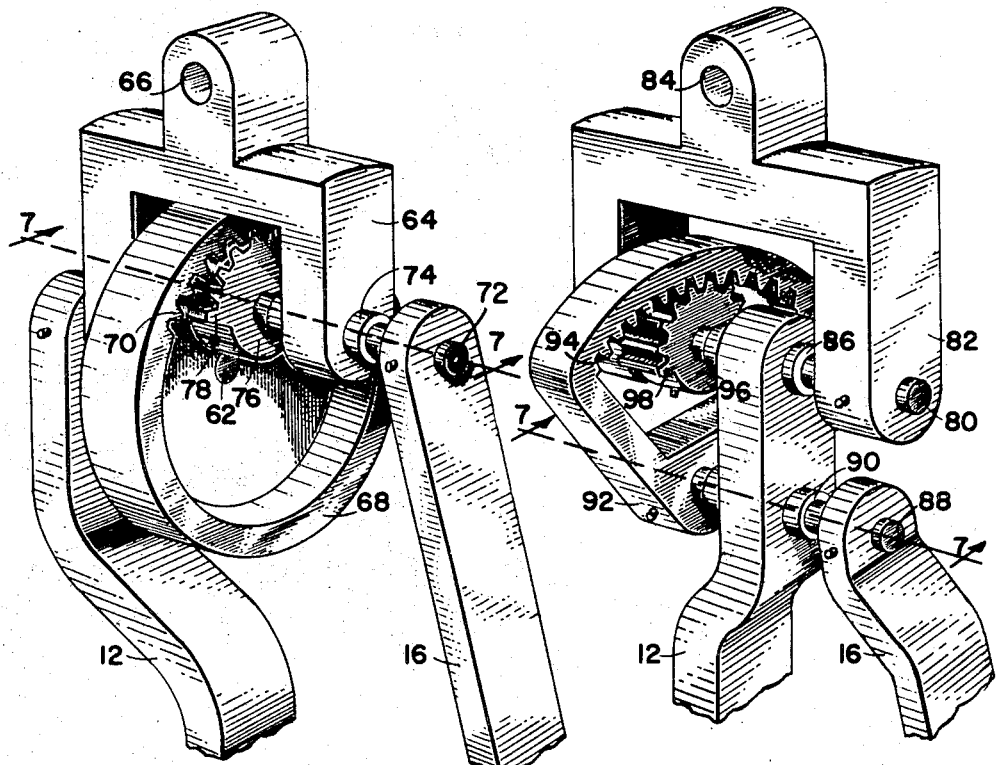
FIG. 5 is a detailed perspective view of still another form of actuator of my invention.
FIG. 6 is a detailed perspective view of yet another form of actuator according to my invention.

Still another modification of my playground swing actuator is shown in FIG. 5 wherein arm 12 is rigidly secured to one end of a shaft 62 and supported for pendulous movement by shaft 62 which is supported in a bracket 64 having a hole 66 for affording attachment of the bracket to frame F. Shaft 62 is mounted in the bracket for pivotal movement relative thereto. Rigidly secured to the other end of shaft 62 from arm 12 is a ring gear 68 having inwardly extending teeth 70 that are arranged concentrically with respect to shaft 62. Arm 16 is rigidly secured to a shaft 72 which is journalled through a bushing 74 supported in bracket 64. On the opposite end of shaft 72 a pinion gear 76 is mounted, which pinion gear has outwardly extending teeth 78 enmeshed with teeth 70 of ring gear 68. It will be noted that pinion 66 is of smaller diameter than ring gear 68, as a consequence of which a torque multiplication is effected between arm 16 and arm 12. Moreover the linkage between arms 12 and 16 as shown in FIG. 5 is such that the arms travel generally in the same direction so that the lower extremity of arm 16 is at all times accessible to the rider in the seat affixed to arm 12.

Another species of my invention, as depicted in FIG. 6, includes a shaft 80 rigidly mounted in a bracket 82 which is provided with a hole 84 perpendicular to shaft 80 for mounting the bracket onto frame F. A bushing 86 is provided for journalling arm 12 on shaft 80 for pendulous movement about the axis of the shaft. Transpiercing arm 12 below shaft 80 is a second shaft 88 which is supported in a bushing 90, the shaft 88 being rigidly secured to arm 16. The opposite end of arm 88 has secured thereto a lever defining means comprising a yoke 92 which defines a plurality of inwardly extending gear teeth 94 that are arcuately disposed with respect to the axis of shaft 88. On the opposite end of shaft 80 from bracket 82 a further portion of said lever defining means comprising a pinion 96 is secured which pinion has outwardly extending teeth 98 which mesh with teeth 94 on the yoke. It will be noted that pinion 96 is secured against rotation with respect to shaft 80 in bracket 82. The axis of contact between teeth 98 and teeth 94 is spaced farther from shaft 88 than from shaft 80 with the result that motion applied to arm 16 will be multiplied by the linkage and applied to arm 12. As in the species of my invention previously described, that of FIG. 6 has the characteristic that arm 16 and arm 12 move generally in the same direction so that the lower extremity of arm 16 is always accessible to the occupant of seat 14 mounted on arm 12.

Figures 7, 8:
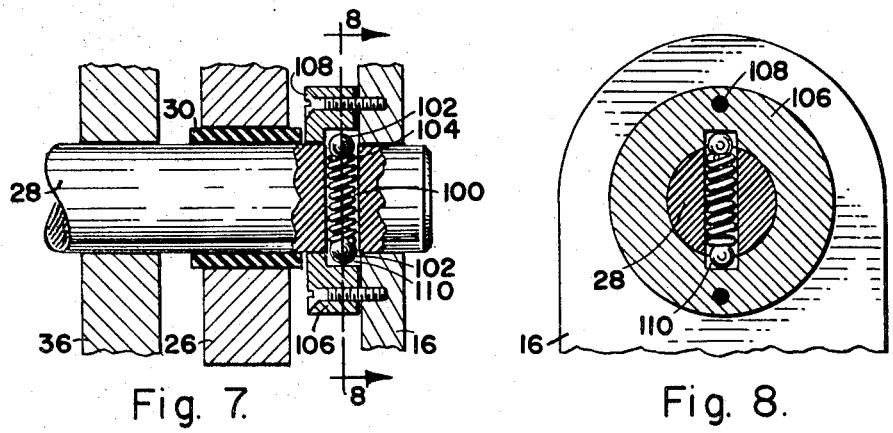
FIG. 7 is a partial view in cross section showing the overload protective mechanism of my invention.
FIG. 8 is a cross-sectional view taken substantially along line 8—8 of FIG. 7.

To eliminate the chance of possible injury by overexuberant application of force to arm 16, I provide an overload device shown in detail in FIGS. 7 and 8. Although the overload device will be described in connection with the embodiment of my invention depicted in FIG. 2 it will be obvious that it has application to other embodiments. The overload device includes a transverse hole 100 diametrally through shaft 28 for receiving a pair of detent balls 102 which are biased outwardly by a compression spring 104. A collar 106 is mounted to arm 16 by fasteners 108 and is bored to circumscribed shaft 28. The internal bore of collar 106 is formed with depressions 110 for receiving a portion of detent balls 102. Thus it is seen that torque is transferred from arm 16 to shaft 28 through collar 106 and detent balls 102. Spring 104 has sufficient force to maintain the detent balls within depressions 110 for all normal speeds of swing operation. The spring however is adapted to yield and permit relative rotation between collar 106 and shaft 28 when excessive force is applied to arm 16. Consequently seat supporting arm 12 cannot be overdriven when the structure of FIGS. 7 and 8 is incorporated in the device.

Thus it will be seen that I have provided an actuator for a playground swing which adds to the enjoyment of swinging in that the rider can control his pendulous movement. Moreover the safety is improved by the fact that the operating mechanism is well above the rider and is compact so that it can readily be enclosed by a protective structure. The overload device contributes to the safety of my swing actuator. While several embodiments of my invention have been shown and described it will be obvious that other adaptations and modifications can be made without departing from the true spirit and scope of the invention.

I claim:

1. A playground swing for attachment to an elevated frame member comprising: a first elongate arm mounted for pendulous movement about a first horizontal axis in fixed relation to said frame; a seat secured to said first arm for supporting a human rider; a second elongate arm mounted for pendulous movement about a second axis parallel to and spaced from said first axis, said second arm depending proximate said seat so as to be accessible to a human rider on the seat; said first and second arms including respectively means defining first and second lever defining means rigidly affixed to respective said arms; and means operatively interconnecting said lever defining means at a movable line that is spaced from said second axis by an amount greater than from said first axis so that said second arm has a mechanical advantage over said first arm for increasing pendulous force to said first arm in response to application of pendulous force to said second arm by a human rider on said seat.

2. A swing according to claim 1 wherein said first lever defining means extends from said first axis in a direction generally opposite the position of said second axis and said second lever defining means extends from said second axis toward an extremity of said first lever defining means remote from said first axis, and wherein said lever interconnecting means comprises a pin secured to one said lever defining means and constituting the movable line, said pin extending toward the other lever defining means in parallel relation to said first and second axis, the other said lever defining means having formed therein an elongate slot for slidably embracing said pin.

3. A swing according to claim 1 wherein said first lever defining means comprises a gear having a plurality of inwardly extending teeth arranged concentrically with said first axis and wherein said second lever defining means comprises a pinion having teeth extending outwardly concentrically relative to said second axis for engaging the teeth of said gear along said movable line.

4. A playground swing for attachment to an elevated frame member comprising: a first elongate arm mounted for pendulous movement about a first horizontal axis in fixed relation to said frame; a seat secured to said first arm for supporting a human rider; a second elongate arm mounted for pendulous movement about a second axis on said first arm, said second axis being parallel to said first axis and spaced therefrom, said second arm depending proximate said seat so as to be accessible to a human rider on the seat; a gear secured to said second arm and having a plurality of inwardly extending teeth arranged concentrically with said second axis, and a pinion having teeth concentric with said first axis and engaged with said gear teeth, said pinion having a smaller radius of curvature than said gear and being fixed against rotation relative said first axis.

References Cited
UNITED STATES PATENTS

| | | | |
|---|---|---|---|
| 477,858 | 6/1892 | Gregory | 272—89 |
| 1,215,110 | 2/1917 | Carey | 272—89 |
| 1,264,172 | 4/1918 | Fritz | 272—88 |
| 2,413,232 | 12/1946 | Hurley | 272—88 |

ANTON O. OECHSLE, Primary Examiner

T. BROWN, Assistant Examiner